United States Patent
Taylor et al.

(10) Patent No.: US 12,531,082 B2
(45) Date of Patent: Jan. 20, 2026

(54) NATURAL SPEECH DETECTION

(71) Applicant: Cirrus Logic International Semiconductor Ltd., Edinburgh (GB)

(72) Inventors: Jonathan Taylor, London (GB); Griff Tanner, London (GB); Jonny Whyte, Edinburgh (GB); John P. Lesso, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 386 days.

(21) Appl. No.: 17/324,511

(22) Filed: May 19, 2021

(65) Prior Publication Data

US 2022/0375490 A1    Nov. 24, 2022

(51) Int. Cl.
| | | |
|---|---|---|
| *G10L 25/60* | (2013.01) | |
| *G10L 15/22* | (2006.01) | |
| *G10L 21/02* | (2013.01) | |
| *G10L 25/21* | (2013.01) | |
| *G10L 25/78* | (2013.01) | |
| *H04R 1/08* | (2006.01) | |
| *H04R 3/04* | (2006.01) | |

(52) U.S. Cl.
CPC .............. *G10L 25/60* (2013.01); *G10L 15/22* (2013.01); *G10L 21/02* (2013.01); *G10L 25/21* (2013.01); *G10L 25/78* (2013.01); *H04R 1/08* (2013.01); *H04R 3/04* (2013.01)

(58) Field of Classification Search
CPC ......... H03M 1/82; H03M 1/121; H03M 1/662
See application file for complete search history.

(56) References Cited

U.S. PATENT DOCUMENTS

| | | | |
|---|---|---|---|
| 4,047,108 A | * | 9/1977 | Bijker ................. H04B 1/66 704/211 |
| 4,159,448 A | * | 6/1979 | Parham ............... H04B 14/026 332/110 |
| 7,403,144 B1 | | 7/2008 | Cruz-Albrecht et al. |
| 10,749,515 B1 | | 8/2020 | Lin |
| 11,295,758 B2 | * | 4/2022 | Gomez ................. G10L 19/018 |
| 2014/0337036 A1 | * | 11/2014 | Haiut ................... G10L 15/20 704/275 |
| 2015/0088509 A1 | * | 3/2015 | Gimenez ............. G10L 17/22 704/243 |
| 2019/0287526 A1 | * | 9/2019 | Ren ..................... G10L 15/005 |
| 2021/0233541 A1 | * | 7/2021 | Chen .................... G10L 17/02 |

OTHER PUBLICATIONS

Combined Search and Examination Report under Sections 17 and 18(3), UKIPO, Application No. GB2118299.3, mailed May 20, 2022.
Rudresh, Sunil et al., A Time-Based Sampling Framework for Finite-Rate-of-Innovation Signals, IEEE International Conf. on Acoustics, Speech and Signal Processing, May 4-8, 2020, INSPEC accession No. 19788779.

\* cited by examiner

*Primary Examiner* — Olujimi A Adesanya
*Assistant Examiner* — Ethan Daniel Kim
(74) *Attorney, Agent, or Firm* — Jackson Walker L.L.P.

(57) ABSTRACT

A microphone device, comprising: a microphone configured to generate an audio signal; a natural speech detection module for detecting natural speech in the first audio signal; wherein, on detection of the natural speech in the first audio signal, the natural speech detection module is configured to output a trigger signal to a speech processing module to process the natural speech in the audio signal.

19 Claims, 13 Drawing Sheets

NATURAL SPEECH DETECTION

TECHNICAL FIELD

The present disclosure relates to methods and apparatus for detecting whether a speech signal is natural or has been replayed, for example through a loudspeaker.

BACKGROUND

Voice biometrics systems are becoming widely used. In such a system, a user trains the system by providing samples of their speech during an enrolment phase. In subsequent use, the system is able to discriminate between the enrolled user and non-registered speakers. Voice biometrics systems can in principle be used to control access to a wide range of services and systems.

Voice biometrics are now increasingly being used in voice user interfaces (VUIs), that is, user interfaces where a user's voice is considered an input, for example in a virtual assistant in a mobile device. Secure Voice Interfaces are VUIs where voice biometrics are used to authenticate the user. In the case of a Voice User Interface in a virtual assistant, the user may enter into a dialogue with the virtual assistant via an audio device comprising one or more microphones. In any voice user interface system, whether implemented with security or not, it is useful to be able to distinguish between natural speech (i.e. speech uttered by a human) and replayed speech (i.e. recorded and played back through a loudspeaker). Conventionally, a voice activity detector (VAD) detects voice in the microphone signal and gates speech processing when voice is present. Since the VAD is not able to distinguish between natural and non-natural speech, in the presence of a television or radio, when voice is replayed through the television or radio, the VAD falsely activates speech processing, leading to high power consumption.

A known approach to detecting replayed speech is to detect a loss of power in a received signal at either high or low frequency bands. Such loss is characteristic of audio replayed through loudspeakers. However, such approaches to natural language detection are also power intensive. This is particularly disadvantageous in applications where power is limited, such as in wireless or battery-powered devices.

SUMMARY

According to a first aspect of the disclosure, there is provided a microphone device, comprising: a microphone configured to generate an audio signal; a natural speech detection module for detecting natural speech in the first audio signal; wherein, on detection of the natural speech in the first audio signal, the natural speech detection module is configured to output a trigger signal to a speech processing module to process the natural speech in the audio signal.

The natural speech detection module preferably consumes less power than the speech processing module. The natural speech detection module may be directly connected to the microphone. In some embodiments, the microphone is packaged with the natural speech detection module.

The natural speech detection module preferably operates in the analogue domain.

The device may further comprise a signal activity detector for detecting signal activity in the audio signal, wherein, on detection of the signal activity, the signal activity detector is configured to output a signal activity signal to the natural speech detection module. The natural speech detection module may be configured to detect the natural speech in the first audio signal in response to the signal activity signal.

The natural speech detection module may be configured to: determine a first likelihood that the audio signal represents natural speech; determine a second likelihood that the audio signal represents speech generated by a loudspeaker; and determine whether the audio signal represents natural speech based on the first likelihood and the second likelihood. Determining that the audio signal represents natural speech based on the first likelihood and the second likelihood may comprise: determining a ratio between the first likelihood and the second likelihood. Determining the first likelihood may comprise detecting modulation of a first frequency band of the audio signal at a speech articulation rate or at a rate of between 4 Hz and 10 Hz. The first frequency band may have an upper cut-off frequency lower than 200 Hz.

Detecting modulation of a first frequency band of the audio signal at a speech articulation rate or at a rate of between 4 Hz and 10 Hz may comprise: low-pass filtering the audio signal; generating an envelope of the low-pass filtered audio signal; band-pass filtering the enveloped low-pass filtered audio signal; determining a frequency of the band-pass filtered enveloped low-pass filtered audio signal.

The natural speech detector may comprise a time encoding machine configured to perform one or more of the low pass filtering and the band-pass filtering.

Determining the first likelihood may comprise detecting modulation of a second frequency band of the audio signal at a speech articulation rate or at a rate of between 4 Hz and 10 Hz. The second frequency band may have a lower cut-off frequency greater than 8 kHz.

Detecting modulation of a first frequency band of the audio signal at a speech articulation rate or at a rate of between 4 Hz and 10 Hz may comprise: high-pass filtering the audio signal; generating an envelope of the high-pass filtered audio signal; band-pass filter the enveloped high-pass filtered audio signal; determining a frequency of the band-pass filtered enveloped low-pass filtered audio signal.

The natural speech detector may comprise a time encoding machine configured to perform one or more of the high pass filtering and the band-pass filtering.

Determining that the audio signal represents natural speech based on the first likelihood and the second likelihood may comprise determining that the first likelihood is greater than the second likelihood. Determining the second likelihood that the sound has been generated by a loudspeaker may comprise: determining a first power in a third frequency band of the audio signal. The third frequency band may have an upper cut-off frequency of 200 Hz.

Determining the second likelihood that the sound has been generated by a loudspeaker may comprise: determining a second power in a fourth frequency band of the audio signal. The third frequency band may have a lower cut-off frequency of 10 kHz.

Determining the second likelihood that the sound has been generated by a loudspeaker may comprise: determining that the first power exceeds a first threshold; and determining that the second power exceeds a second threshold.

Determining the second likelihood that the sound has been generated by a loudspeaker may comprise: comparing the first power to the second power.

For example, the comparing the first power to the second power may comprise: determining a ratio of the first power to the second power; and determining whether the ratio falls between a first ratio threshold and a second ratio threshold.

The ratio of the first power S1 to the second power S2 is determined by:

$$\frac{S1}{S2} = \exp\{\log(S1) - \log(S2)\}$$

Alternatively, determining the ratio may comprises: time-encoding the audio signal to generate a first pulse-width modulated (PWM) signal representing the first frequency band; time-encoding the second signal to generate a second PWM signal representing the second frequency band. Determining the ratio may further comprises: providing the first PWM signal to a data input of a counter; and providing the second PWM signal to a clock input of the counter; outputting the ratio from the counter. The first PWM signal and the second PWM signal may be encoded to have different limit cycles. For example a limit cycle of the second PWM signal may be less than a limit cycle of the first PWM signal.

According to another aspect of the disclosure, there is provided a system, comprising: the device described above; and the speech processing module.

The speech processing module may operate in the digital domain. The speech processing module may use more power than the device.

According to another aspect of the disclosure, there is provided a method of detecting whether a sound has been generated by natural speech, the method comprising: receiving an audio signal comprising the sound; determining a first likelihood that the sound is natural speech; determining a second likelihood that the sound has been generated by a loudspeaker; and detecting whether the sound has been generated by natural speech based on the first likelihood and the second likelihood.

Detecting whether the sound has been generated by natural speech based on the first likelihood and the second likelihood may comprises: determining a ratio between the first likelihood and the second likelihood.

Determining the first likelihood may comprise detecting modulation of a first frequency band of the audio signal at a speech articulation rate or at a rate of between 4 Hz and 10 Hz. The first frequency band may have an upper cut-off frequency lower than 200 Hz.

Detecting modulation of a first frequency band of the audio signal at a speech articulation rate or at a rate of between 4 Hz and 10 Hz may comprise: low-pass filtering the audio signal; generating an envelope of the low-pass filtered audio signal; band-pass filtering the enveloped low-pass filtered audio signal; determining a frequency of the band-pass filtered enveloped low-pass filtered audio signal. One or more of the low-pass filtering and the high-pass filtering may be performed using a time encoding machine.

Determining the first likelihood may comprise: detecting modulation of a second frequency band of the audio signal at a speech articulation rate or at a rate of between 4 Hz and 10 Hz. The second frequency band may have a lower cut-off frequency greater than 10 kHz.

Detecting modulation of a first frequency band of the audio signal at a speech articulation rate or at a rate of between 4 Hz and 10 Hz may comprise: high-pass filtering the audio signal; generating an envelope of the high-pass filtered audio signal; band-pass filtering the enveloped high-pass filtered audio signal; and determining a frequency of the band-pass filtered enveloped low-pass filtered audio signal.

One or more of the high-pass filtering and the high-pass filtering may be performed using a time encoding machine.

Detecting whether the sound has been generated by natural speech based on the first likelihood and the second likelihood may comprise determining that the first likelihood is greater than the second likelihood.

Determining the second likelihood that the sound has been generated by a loudspeaker may comprise: determining a first power in a third frequency band of the audio signal. The third frequency band may have an upper cut-off frequency of 200 Hz.

Determining the second likelihood that the sound has been generated by a loudspeaker may comprise: determining a second power in a fourth frequency band of the audio signal. The third frequency band may have a lower cut-off frequency of 10 kHz.

Determining the second likelihood that the sound has been generated by a loudspeaker may comprise: determining that the first power exceeds a first threshold; and determining that the second power exceeds a second threshold.

Determining the second likelihood that the sound has been generated by a loudspeaker may comprise comparing the first power to the second power.

The comparing the first power to the second power may comprise: determining a ratio of the first power to the second power; and determining whether the ratio falls between a first ratio threshold and a second ratio threshold.

The ratio of the first power S1 to the second power S2 may be determined by:

$$\frac{S1}{S2} = \exp\{\log(S1) - \log(S2)\}$$

Alternatively, determining the ratio may comprise: time-encoding the audio signal to generate a first pulse-width modulated (PWM) signal representing the first frequency band; time-encoding the second signal to generate a second PWM signal representing the second frequency band. Determining the ratio may further comprise: providing the first PWM signal to a counter synchronised to a clock signal; and providing the second PWM signal to the counter as the clock signal; outputting the ratio from the counter. The first PWM signal and the second PWM signal may be encoded to have different limit cycles. For example, a limit cycle of the second PWM signal may be less than a limit cycle of the first PWM signal.

According to another aspect of the disclosure, there is provided a non-transitory storage medium having instructions thereon which, when executed by a processor, cause the processor to perform the method described above.

According to another aspect of the disclosure, there is provided an apparatus for detecting whether a sound has been generated by natural speech, the apparatus comprising: an input for receiving an audio signal comprising the sound; one or more processors configured to perform the method described above.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

BRIEF DESCRIPTION OF DRAWINGS

Embodiments of the present disclosure will now be described by way of non-limiting examples with reference to the drawings, in which.

DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

In this disclosure, the term "speaker recognition" is used to refer to a process in which information is obtained about the identity of a speaker. For example, this process may involve determining whether or not the speaker is a specific individual (speaker verification), or may involve identifying the speaker, for example from a group of enrolled speakers (speaker identification). The term "speech recognition" is used to refer to a process in which information is obtained about the content of speech, for example in order to be able to determine what the speaker is saying.

Figure 1:
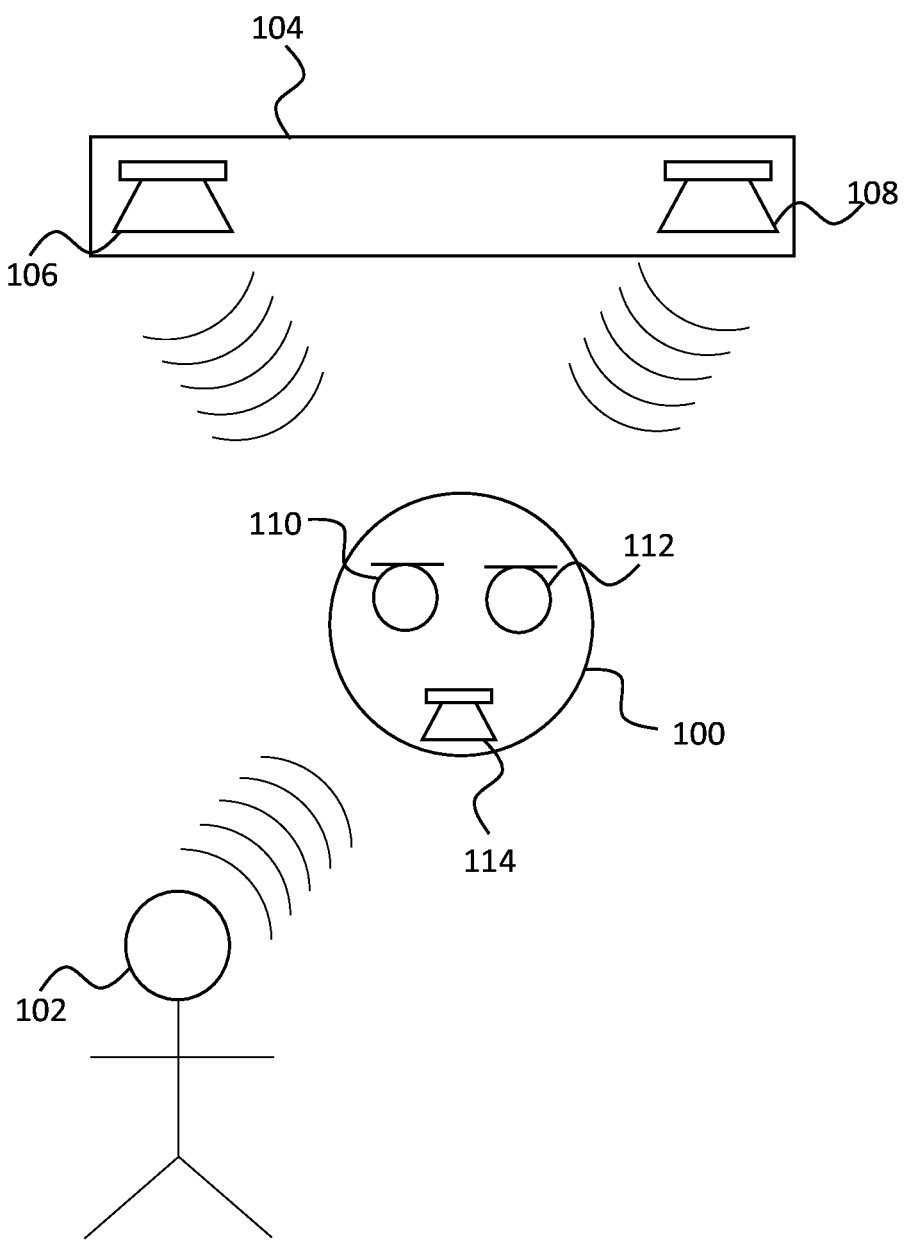
FIG. 1 is a schematic diagram of a device according to embodiments of the present disclosure in an environment.

FIG. 1 is a schematic diagram of an audio device 100 according to various embodiments of the present disclosure, situated in proximity to a user 102 of the audio device 100 and an entertainment device 104. The entertainment device 104 may be a television, a radio, a sound system, or any other device configured to deliver sound to a user 102. The entertainment device 104 comprises a pair of loudspeakers 106, 108 configured to output sound which in some cases may represent human speech. For example, when the entertainment device 104 comprises a television or radio news broadcast, the sound being output from the entertainment device 104 will primarily represent human speech.

The audio device 100 comprises one or more (in this example two) microphones 110, 112 configured to receive incident sound. The audio device 100 may be configured to perform one or more functions in response to spoken commands from an enrolled user received at the one or more microphones 110, 112. The audio device 100 may also comprise one or more loudspeakers 114 configured to deliver sound to the user 102.

The audio device 100 may be operable to distinguish between spoken commands from an enrolled user, and the same commands when spoken by a different person. The one or more functions may comprise speaker recognition processes and/or speech recognition processes performed on the received sound. Such processes may be performed to interpret one or more keywords or commands spoken by an enrolled user, such as the user 102 of the audio device 100. For example, the audio device 100 may be configured to continuously listen for trigger words (e.g. "Hey Siri") and/or commands (e.g. "Open Spotify") present in sound received at the audio device. Thus, certain embodiments of the disclosure relate to the operation of the audio device 100 or any other device in which biometric functionality is performed in the device that is intended to carry out the spoken command. Certain other embodiments may relate to methods in which the voice biometric functionality is performed on the audio device 100, which then transmits the commands to a separate (host) device if the voice biometric functionality is able to confirm that the speaker was the enrolled user.

The audio device 100 may comprise or be embodied in, for example, a remote control system (such as a remote control for the entertainment system 104), a home control system, a home entertainment system, a smartphone, a tablet or laptop computer, a games console, an in-vehicle entertainment system, a domestic appliance or the like.

The scenario shown in FIG. 1 poses a challenge for the audio device 100, due to the presence of multiple sound sources which may each be configured to generate sound representative of human speech. When the user 102 speaks, they generate natural speech which can be picked up by the one or more microphones 110, 112 of the audio device 100. When the entertainment device 104 outputs media to the one or more loudspeakers 106, 108 representing speech, this speech sound may also be picked up by the one or more microphones 110, 112 of the audio device 100.

There exists a need, therefore, to be able to differentiate between sound generated by natural speech of the user 102 and sound generated artificially, i.e. by a loudspeaker. When the audio device 100 is powered by battery, there also exists a need to do so in the most power efficient manner possible, so as to minimize power used by the audio device 100.

Embodiments of the present disclosure aim to address or at least ameliorate one or more of the above described problems by implementing a low power natural speech detection circuitry in a microphone. The natural speech or voice detection is configured to differentiate between natural speech and speech replayed through a loudspeaker. Then, only when it is determined that the speech present in a microphone signal generated at the microphone, a trigger signal is provided to downstream processing circuitry to activate speech processing. By providing low power natural speech detection circuitry in a microphone, for example packaged with the microphone, power consumption of downstream circuitry is reduced. Certain embodiments of the present disclosure aim to implement such natural speech detection in the analogue domain. In doing so, the need for power intensive digital signal processing and clock circuitry, and memory are removed from the initial processing of received microphone signals.

Embodiments of the present disclosure also provide novel methods for detecting the presence of natural speech in a received audio signal by determining a likelihood that the received speech is natural, determining a likelihood that the received speech is replayed (e.g. generated by a loudspeaker) and comparing the two likelihoods.

Figure 2:
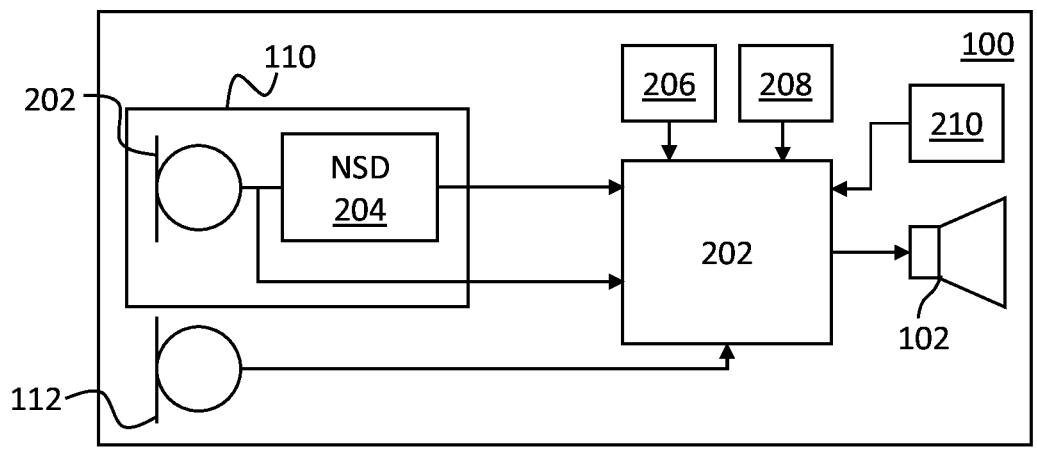
FIG. 2 is a block diagram of the device shown in FIG. 2.

FIG. 2 is a schematic diagram showing the audio device 100 in more detail. The one or more microphones 110, 112 comprise a first microphone 110 and a second microphone 112. In variations of that shown, the second microphone 112 may be omitted. The first microphone 110 comprises a transducer 200 and a natural speech detection (NSD) module 204. The NSD module 204 is configured to output a trigger signal in response to detecting natural speech in a microphone signal generated by the transducer 202.

A signal processor 202 of the audio device 100 is configured to receive microphone signals from the microphones 110, 112 and the trigger signal from the NSD module 204 and output audio signals to the loudspeaker 114. The processor 202 may be configured to obtain biometric data from the one or more microphones 104, 106, as will be explained in more detail below. In the example shown in FIG. 2, the NSD module 205 is comprised in the first microphone 110. In other embodiments, the NSD module 205 may be provided separate to the first microphone 110. For example, the NSD module 205 may be implemented using the signal processor 202.

The audio device 100 further comprises a memory 206, which may in practice be provided as a single component or as multiple components. The memory 206 is provided for storing data and/or program instructions. The audio device 100 may further comprise a transceiver 208, which is provided for allowing the audio device 100 to communicate (wired or wirelessly) with external devices, such as a host device to which the audio device 100 is coupled. For example, the audio device 100 may be connected to a network and configured to transmit audio and/or voice biometric data received at or generated by the audio device 100 to the cloud or to a remote server for further processing. For example, the host device may be a mobile device (e.g. smartphone). Communications between the audio device 100 and external device(s) may comprise wired communications where suitable wires are provided. The audio device 100 may be powered by a battery 210 and may comprise other sensors (not shown). It will be appreciated that methods described herein may be implemented on the audio device 100 or on a host device to which the audio device 100 is connected, or in the cloud (e.g. on a remote server), or a combination of all three.

Figure 3:
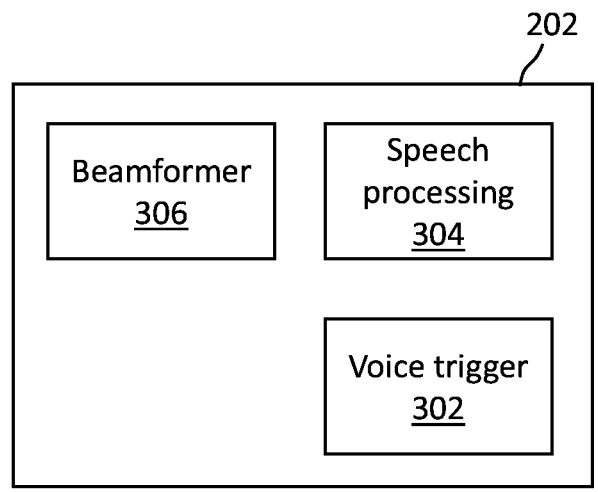
FIG. 3 is a block diagram of an example implementation of the processor of the device shown in FIG. 2.

FIG. 3 is a schematic diagram of the processor 202 according to some embodiments. The processor 202 may be configured to implement one or more of a voice trigger module 302, a speech processing module 304, and a beamformer module 306. The voice trigger module 302 may be configured to search for a specific trigger-word or keyword or phrase of speech in the microphone signals received from the first and second microphones 110, 112. Common trigger words or phrases include "Hey Siri", "OK Google" and "Alexa". The speech processing module 304 may be configured to process the speech received in the microphone signals to determine what is being said in the speech, for example to determine whether the speech comprises a command which needs to be actioned. The beamformer module 306 may be configured to determine a direction of incidence of sound or speech at the audio device 100 by comparing the microphone signals received from the first and second microphones 110, 112.

Additional functions of the voice trigger module 302, the speech processing module 304 and the beamformer module 306 are well known in the art and so will not be explained in more detail here. However, it is noted that implementation of each of the voice trigger module 302, the speech processing module 304 and the beamformer module 306 can be particularly power and processor intensive. Accordingly, it is desirable to only activate these modules 302, 304, 306 when speech is present in the microphone signals derived by the microphones 110, 112 is that of natural speech generated by a user of the audio device 100, as opposed to replayed speech generated by a loudspeaker, such as one of the loudspeakers present in the entertainment device 104 shown in FIG. 1.

The NSD module 204 is preferably configured to use substantially less power than the signal processor 202 such that when no natural speech is present at the microphones 110, 112 the audio device 100 consumes substantially less power than when natural speech is present. In such circumstances, the processor 202 may be powered down or put into a low-power or sleep mode until the NSD module 204 outputs a trigger signal to the processor 202 indicating that natural speech is present in the microphone signal derived by the transducer 200. As mentioned above, the NSD module 204 and the transducer 200 are preferably packaged together in the microphone 110 and may be independently powered.

Figure 4:
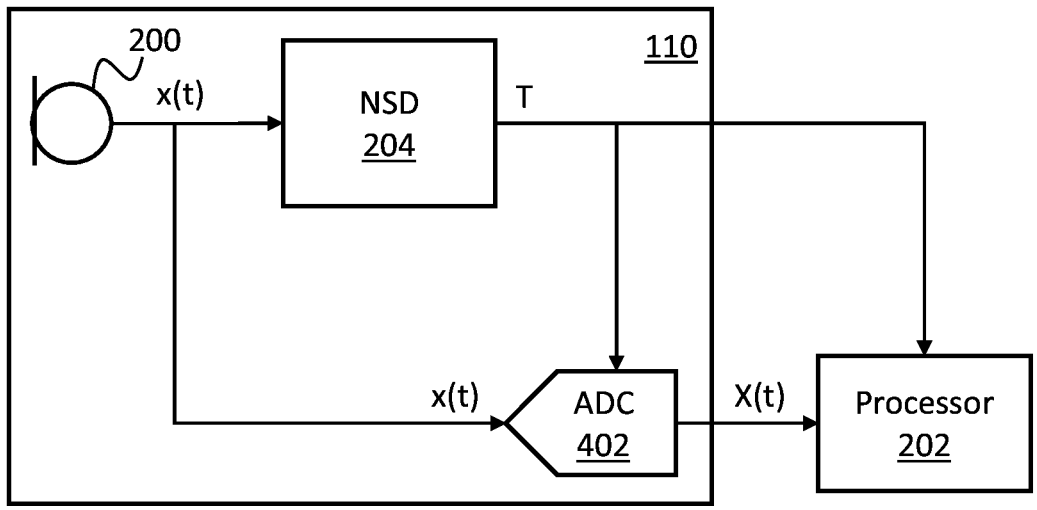
FIG. 4 is a schematic diagram of an example implementation of a natural speech detection module.

FIG. 4 is a schematic illustration of an example implementation of the microphone 110 according to embodiments of the present disclosure. The NSD module 204 receives and processes an analogue microphone signal x(t) and outputs a trigger signal T on detection of natural speech in the received microphone signal x(t). The microphone 110 further comprises an analogue to digital converter (ADC) 402 configured to convert the analogue microphone signal x(t) into a digital microphone signal X(t) which is then provided to the processor 202. Thus, in this example, the ADC 402 is also packaged with the microphone 110. In other embodiments, the ADC 402 may be provided on the audio device 100 separate to the microphone 110.

Figure 5:
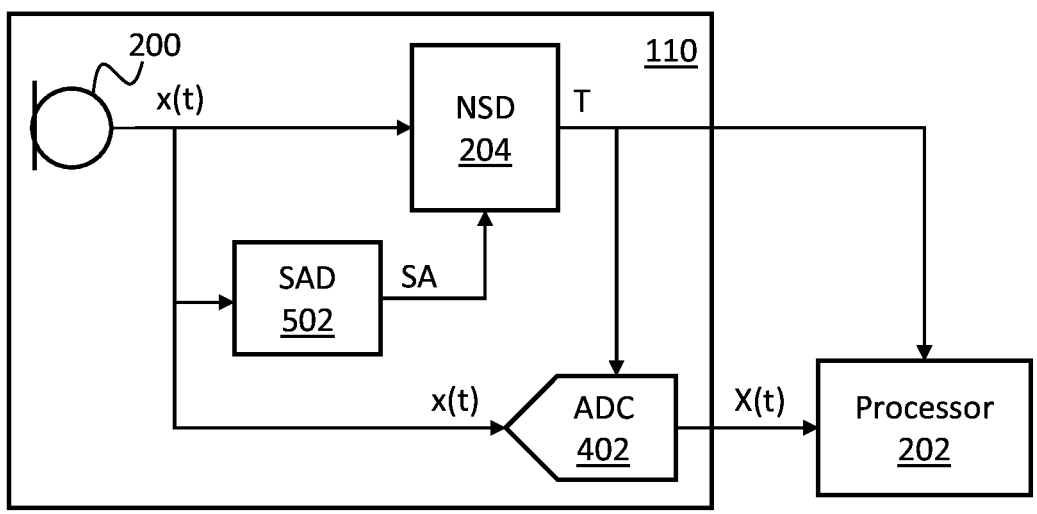
FIG. 5 is a schematic diagram of another example implementation of a natural speech detection module.

FIG. 5 is a variation of the microphone 110 shown in FIG. 4, further comprising a signal activity detect (SAD) module 502. The SAD module 502 receives the microphone signal x(t) and outputs a signal activity signal SA to the NSD module 204 based on activity in the microphone signal x(t). For example, the SAD module 502 may monitor for a presence of the microphone signal x(t). For example, the SAD module 502 may determine whether the microphone signal x(t) meets some predetermined criteria, for example wherein the amplitude of the microphone signal x(t) exceeds a threshold amplitude. For example, the SAD module 502 may determine whether the amplitude of the microphone signal x(t) exceeds a threshold amplitude over a predetermined time period. On detection of signal activity, the SAD module 502 may output the signal activity signal SA to the NSD module 204. The signal activity signal SA may power up the NSD module 204, such that the NSD module 204 is only enabled (and therefore consuming power) when signal activity has been detected in the microphone signal x(t). The SAD module 502 preferably consumes less power than that NSD module 204. As such, when signal activity does not meet the predetermined criteria, the power consumption of the microphone 110 (and therefore the audio device 100) is significantly reduced. It will be appreciated that in some embodiments the NSD 205, the SAD 502 and/or the ADC 402 may be provided external to the microphone, for example in the processor 202.

The implementations described above with reference to FIGS. 2 to 5 have several power saving advantages when compared to conventional voice activity detectors which are unable to discern between natural and replayed speech. For example, if we consider that the average household in the USA watches 4 hours of television per day, and listens to 1 hour of music per day, then 5 hours in every 24 comprise replayed sound. Natural speech may, for example, be present for 1 hour during that same 24 hour period. In which case, 75% of the time there will be no sound (i.e. no signal), 21% of the time there will be replayed speech, and 4% of the time there will be natural speech. Using the microphone 110 shown in FIG. 5, the NSD module 204 will therefore only be activated 25% of the time (i.e. when a signal is detected by the SAD module 502), compared to 100% of the time if the SAD module 502 was omitted.

Operation of the NSD module 204 according to various embodiments of the disclosure will now be explained with reference to FIGS. 6 to 8.

Figure 6:
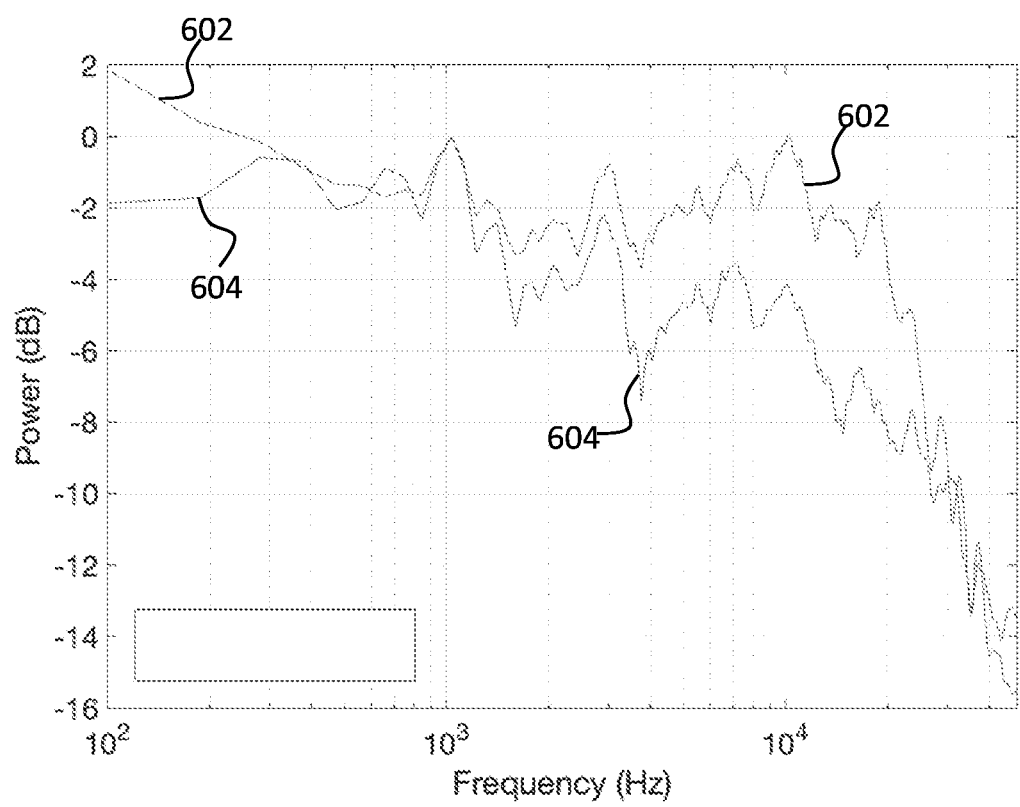
FIG. 6 is a graph comparing a natural speech power spectrum and a replayed speech power spectrum for the same speech.

FIG. 6 is graph showing an average natural speech power spectrum 602 of natural speech and an average replayed speech power spectrum 604 of the same speech replayed through one of the loudspeakers 106, 108 of the entertainment device 104. It can be seen that at low frequencies, for example frequencies below 200 Hz, the power in the natural speech power spectrum 602 is greater than that in the corresponding replayed speech power spectrum 604. Likewise, in the tens of kHz region (e.g. between 4 and 11 kHz), the power in the natural speech power spectrum 602 is greater than that in the corresponding replayed speech power spectrum 604. On the contrary, at frequencies around 1 kHz, the power in the natural and replaced speech power spectrums 602, 604 is substantially similar.

Figure 7A:
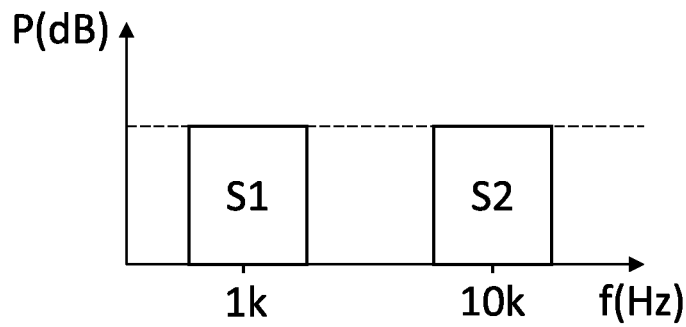
FIGS. 7A and 7B graphically illustrate integrated power in two frequency bands for the natural speech power spectrum and the replayed speech power spectrum shown in FIG. 6.
Figure 7B:
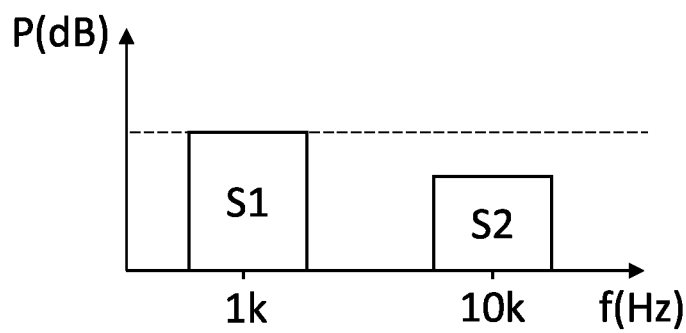

FIGS. 7A and 7B graphically illustrate the integrated power in two bands, labelled S1 and S2, for the natural speech power spectrum 602 and the replayed speech power spectrum 604, respectively. The first band S1 is centred around 1 kHz. The second band S2 is centred around 10 kHz. It can be seen that the power in the first band S1 for each of the natural and replayed speech is substantially similar, whereas the power in the second band S2 for each of the natural and replayed speech is different.

Embodiments of the present disclosure exploit the differences and similarities in characteristics of the power spectrums 602, 604 of the natural and replayed speech to differentiate between natural and replayed speech.

Figure 8:
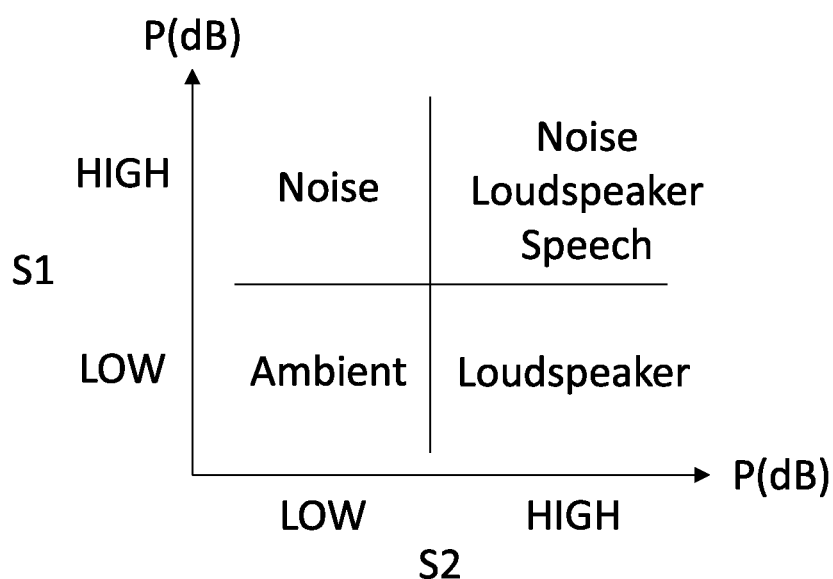
FIG. 8 is a graph of power in a first frequency band of a microphone signal vs power in a second frequency band of the microphone signal.

FIG. 8 is graph of power in the first band S1 vs power in the second band S1 of the microphone signal x(t).

When the power in the first and second bands S1, S2 are both low (bottom left quadrant of FIG. 8), for example below a predetermined threshold, then it can be determined that the microphone signal x(t) does contains ambient sound or no sound at all.

When the power in the first (low frequency) band S1 is high, but the power in the second (higher frequency) band S2 is low (top left quadrant in FIG. 8), then it can be assumed that microphone signal x(t) contains noise and does not contain speech (which has high and low frequency components).

When the power in the first (lower frequency) band S1 is low or lower than a predetermined threshold but the power in the second (higher frequency) band S2 is high or higher than a predetermined threshold (bottom right quadrant in FIG. 8), then it can be determined that the microphone signal x(t) contains replayed speech, e.g. from a loudspeaker. Thus detection of replayed speech, e.g. from a loudspeaker, can easily be ascertained by determining the power in the first and second frequency bands S1, S2.

When the power in the first and second bands S1, S2 are both high (top right quadrant of FIG. 8), for example above a predetermined threshold, then it can be determined that the microphone signal x(t) contains either noise, natural speech, or replayed speech from a loudspeaker.

To ascertain whether the speech is natural speech or replayed speech, different power thresholds may be set for the first and second frequency bands S1, S2. In doing so, referring to FIG. 6 and FIG. 7B, the difference in power in the second band S2 may be exploited. For example, the power in the natural and replayed speech power spectrums 602, 604 at 1 kHz (corresponding to the first and S1) is substantially the same. In contrast, the power in the average natural speech power spectrum 602 is greater than −3 dB at 10 kHz (corresponding to the second band S2) whereas the power in the replayed speech power spectrum 604 is less than −3 dB at 10 kHz (corresponding to the second band S2).

Thus, the NSD module 204 may be configured to determine the ratio of power in the first band S1 to power in the second band S2 may be used to determine whether the received microphone signal x(t) contains natural or replayed speech. A determination may be made as to whether the ratio of S1 to S2 falls within a threshold range, α→β (alpha to beta):

$$\alpha < \frac{S1}{S2} < \beta$$

A set of values for alpha and beta may be provided for natural speech, for replayed speech, or for both natural and replayed speech. In some embodiments, the threshold range may be specific to a particular user. For example, the threshold range may be set during enrolment of a user.

Preferably, as mentioned above, the NSD module 204 may be implemented using analogue circuitry. Doing so may remove the requirement for an external clock (required for equivalent digital implementations) and other power intensive electronics required for digital implementation.

In some embodiments, the NSD module 204 may calculate the ratio of S1 to S2 using a logarithmic approach based on the following approximation.

$$\frac{S1}{S2} = \exp\{\log(S1) - \log(S2)\}$$

Figure 9:
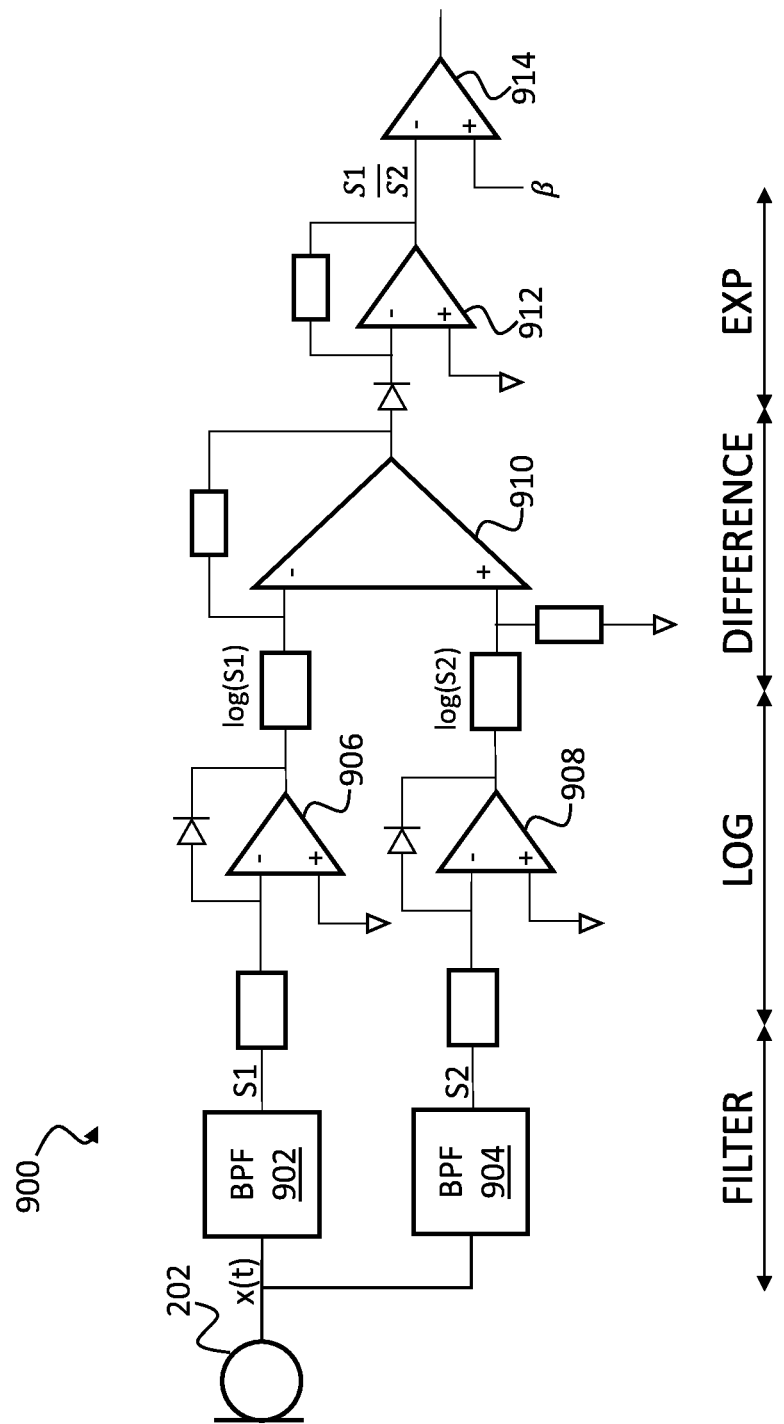
FIG. 9 is a schematic diagram of a ratio circuit according to embodiments of the present disclosure.

FIG. 9 is a circuit diagram of an example ratio circuit 900 which may be implemented by the NSD module 204. The ratio circuit 900 comprises first and second bandpass filters 902, 904, first and second log amplifiers 906, 908, a difference amplifier 910, an exponential (or anti-log) amplifier 912 and a comparator 914.

The microphone signal x(t) is provided to the first and second bandpass filters 902, 904. The first bandpass filter 902 is configured to pass frequencies of the microphones signal x(t) centred around a first centre frequency, in this case 1 kHz corresponding to the first frequency band S1 (although in other embodiments a different first centre frequency may be used). The second bandpass filter 904 is configured to pass frequencies of the microphones signal x(t) centred around a second centre frequency, in this case 10 kHz corresponding to the second frequency band S2 (although in other embodiments a difference second centre frequency may be used).

First and second bandpass filtered signals S1, S2 are then provided to respective first and second log amplifiers 906, 908 which respectively output first and second log signals, being logarithms of the first and second bandpass filtered signal S1, S2 (log(S1) and log(S2) respectively).

The first and second log signals log(S1), log(S2) are then respectively provided to inverting and non-inverting inputs of the difference amplifier 910 which calculated and outputs a difference signal representing a difference between the first and second log signals (log(S1)−log(S2)).

The difference signal output from the difference amplifier 910 is provided to the exponential amplifier 912 which computes and outputs the exponential of the difference signal, i.e. exp{log(S1)−log(S2)}. Thus, the exponential amplifier 912 outputs a ratio signal representing the ratio of S1 to S2.

The ratio signal S1/S2 may then be provided to the comparator 914 which compares the ratio signal S1/S2 to the threshold beta. A similar comparator (not shown) may be provided to compare the ratio signal S1/S2 to the threshold alpha.

Thus, the ratio circuit 900 shown in FIG. 8 has the benefit of being able to compute the ratio S1 to S2 in the analogue domain without the need for power intensive clock circuitry.

Accordingly, in some embodiments, the NSD module 204 may compute the ratio S1 to S2 using one or more time encoding modulators (TEMs).

Figure 10:
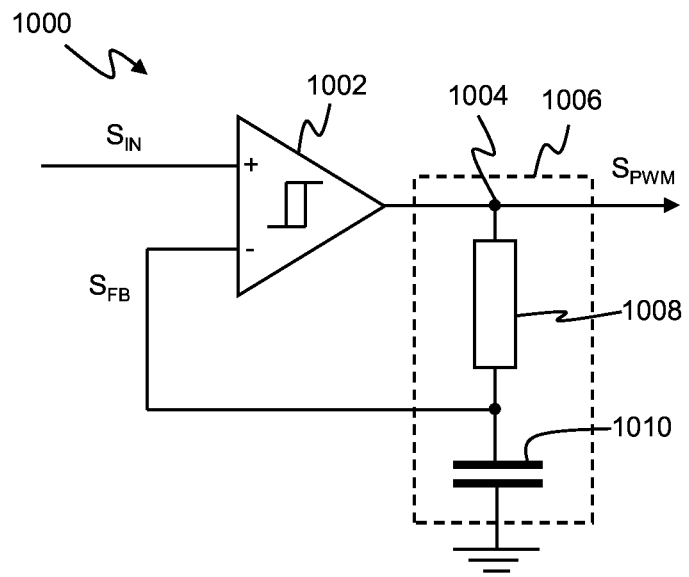
FIG. 10 is a schematic diagram of a time encoding modulator.

A schematic diagram of an example time encoding modulator (TEM) 1000 is shown in FIG. 10. Generally, the TEM 1000 is configured to receive an input signal SIN, which may for instance be an input analogue audio signal received from a microphone, such as the microphone signal x(t), and generating a corresponding time-encoded signal. In at least some embodiments of the disclosure the time-encoded signal is a pulse-width modulated (PWM) signal SPWM that alternates between different signal levels to encode the signal level of the input signal SIN by the proportion of time spent in each output state. Typically the PWM signal SPWM may swap between first and second output states and the signal level of the input signal may be encoded by the duty cycle of a first output state, i.e. the proportional of the overall cycle period that corresponds to the first output state, or equivalently the amount of time that the PWM signal SPWM spends in the first output state compared to the second output state.

It will be appreciated that a variety of time encoding techniques exist which can be used to generate a PWM signal, such as asynchronous PWM, self-oscillating carrier PWM (as shown in FIG. 10), or fixed carrier PWM.

In the embodiment shown in FIG. 10, the time-encoding modulator (TEM) 1000 advantageously comprises a hysteretic comparator 1002. In this embodiment the hysteretic comparator 1002 is arranged to receive the input signal SIN at a first comparator input, in this example input (+). The hysteretic comparator 1002 compares the input signal SIN at the first comparator input with a feedback signal SFB received at a second comparator input, in this example input (−), and applies hysteresis to the comparison to generate the PWM signal SPWM at a comparator output node 1004. A feedback path also extends from the comparator output node 1004 to the second comparator input, in this example input (−), for providing the feedback signal SFB to the second comparator input. A loop filter arrangement 1006 is arranged to apply filtering to the feedback path to provide the feedback signal SFB. In this embodiment the loop filter arrangement 1006 comprises a resistive-capacitive (RC) filter having an impedance 1008 in the feedback path and a capacitance 1010 coupled between the feedback path and a reference voltage, e.g. ground. Whilst the filter arrangement 1006 may be implemented using resistors and capacitors as illustrated, other RC components such as FET based resistances and/or capacitances may be used in some implementations.

The hysteretic comparator 1002 compares the signals at the first and second comparator inputs, i.e. the input signal SIN and the feedback signal SFB, and outputs either of two output states, VH and VL, depending on the result of the comparison. The hysteretic comparator 1002 is operable to apply hysteresis to the comparison such that a differential voltage between the signals SIN and SFB at the first and second comparator inputs must be greater (i.e. more positive or less negative) than a first threshold to transition from one output state to the other, say from output state VL to the output state VH, but must be lower (i.e. less positive or more negative) than a second, different threshold to make the opposite transition, e.g. to swap from the output state VH to the output state VL. The difference between these first and second thresholds corresponds to the amount of hysteresis applied. In some implementations the first and second thresholds may be equal in magnitude and opposite in polarity, i.e. the difference between the input signal SIN and the feedback signal SFB must be greater than an amount +H to transition to one state, say VH, and must be lower than −H to transition to the other state, say VL. In this instance the magnitude of H can be seen as a measure of the hysteresis applied by the hysteretic comparator 1002 and the hysteresis applied is symmetric. It will be understood however that the hysteresis applied could be asymmetric in some implementations.

In some embodiments the output states VH and VL may be high and low voltage levels respectively, for instance a supply voltage VDD (VH) and ground (VL), or a positive voltage V+ (VH) and a negative voltage V− (VL), possibly of equal magnitude. Thus the PWM signal SPWM transitions between two output voltage states.

The input signal SIN is thus compared to the feedback signal SFB which is derived from the output PWM signal SPWM. The feedback signal SFB corresponds to a filtered version of the PWM signal SPWM and the filter arrangement 1006 provides some delay and signal averaging over time. Thus if the PWM signal SPWM transitions to the high state VH, the feedback signal SFB will, initially, be lower than the present state of the PWM signal SPWM and will begin to increase, i.e. become more positive, over a period of time. If the input signal SIN is itself relatively constant over that period of time the difference between the input signal SIN and the feedback signal SFB will decrease, i.e. become less positive/more negative, until the relevant threshold is reached and the PWM signal SPWM transitions to the other output state VL. At this point the value of the feedback signal SFB will start to decrease. The hysteretic comparator 201 will maintain the low state VL until the difference between the input signal SIN and the feedback signal SFB increases, i.e. becomes less negative/more positive, to the second threshold.

Note that the arrangement illustrated in FIG. 10 assumes that the input signal SIN will vary within a range within the voltage range of the output state VH and VL and is referenced to a midpoint voltage VMID which is equal to the midpoint voltage between VH and VL. If necessary, level shifting and/or scaling could be applied to at least one of the input signal SIN or feedback signal SFB.

Thus if the input signal SIN maintains a relatively constant level the output of the hysteretic comparator 1002 will continually cycle between the first and second output states VH and VL. The time spent in each output state will depend on how long it takes for the feedback signal SFB to change by the amount defined by the hysteresis, e.g. from a value equal to SIN−H to a value SIN+H or vice versa. This will depend on the amount of hysteresis and the rate of change of the feedback signal SFB. However the rate of change of the feedback signal SFB will depend on the then-current value of the feedback signal SFB, in particular the difference between the level of the output state, i.e. VH or VL, and the value of the feedback signal SFB, which in turn depends on the level of the input signal SIN.

The duration of a pulse corresponding to the high state VH in the PWM signal SPWM (and correspondingly the duration of a pulse corresponding to the low state VL in the PWM signal SPWM) thus depends on the level of the input signal SIN. The TEM 1000 encodes the input signal SIN as the duty cycle of the PWM signal SPWM, i.e. the ratio between the duration of a pulse of a first output state, say VH, to the duration of the cycle period.

Figure 11:
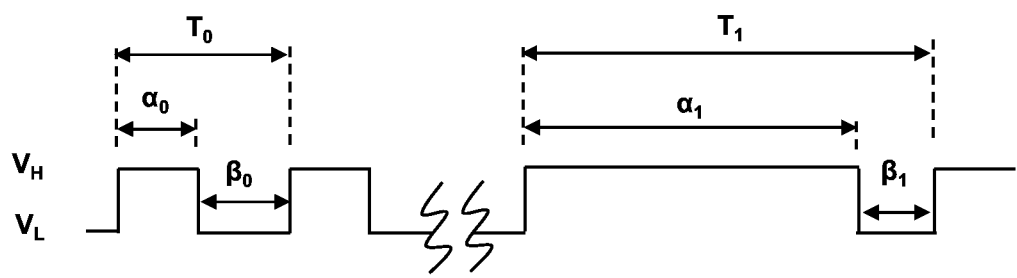
FIG. 11 is a timing diagram for the output SPWM of the time encoding modulator of FIG. 10.

FIG. 11 illustrates the principles of the PWM signal SPWM of the TEM 1000 shown in FIG. 10. The PWM signal SPWM varies between the two output states VH and VL. The duration of a pulse of the high state VH is denoted by a and the duration of a pulse of the low state VL is denoted by 3. The cycle period T is equal to α+β. For cycles which do not correspond to duty cycles of 100% or 0% the cycle period T can also be seen as the period between an instance of a transition from one output state to the other output state and the next instance of the same transition.

As described above the duration a of the pulse of the high state VH depends on the level of the input signal SIN, as does the duration of the pulse of the low state VL. For signals of zero magnitude (which corresponds to a signal reference voltage value equal to the midlevel voltage VMID between VH and VL) the periods of the pulses of each state, illustrated in FIG. 2 as α0 and β0, will be equal to one another, i.e. each equal to T0/2 where T0 is the cycle period at zero magnitude. If the magnitude of the input signal SIN increases the duration of the pulse of one state will increase and the duration of the pulse of the other state will decrease to first order by:

$$\alpha = T0/2 \cdot (1-X) \beta = T0/2 \cdot (1-X)$$

where X is the level of the normalised input signal, i.e.

$$X = SIN/SMAX$$

where SMAX is the maximum magnitude of the input signal defined as (VH−VL)/2. It will be appreciated that an increase in duration of one pulse is not equal to the decrease in duration of the other pulse and so the overall cycle period T will change:

$$T = \alpha + \beta = T0/(1-X2)$$

Thus any increase in the magnitude of the input signal will result in an increase in the cycle period, as illustrated by the durations α1 and β1 and duration T1 for a cycle period at a non-zero input signal magnitude. Thus the cycle period T0 (equal to α0+β0) corresponding to an input signal of zero magnitude will be the cycle period of shortest duration. This condition is referred to as the limit cycle and the period T0 is the limit cycle period. This corresponds to the fastest cycle frequency f0=1/T0 which is referred to as the limit cycle frequency.

As noted above the output is a voltage waveform that has a limit cycle period of T0 for a zero-magnitude input signal. For the embodiment illustrated in FIG. 10 the limit cycle period is given by:

$$T0 = 2 \cdot R \cdot C \cdot \ln\{(1+H/(2 \cdot SMAX))/(1-H/(2 \cdot SMAX))\}$$

where R is the resistance of impedance 1008, C is the value of capacitance 1010 (and R·C is the time constant of the filter arrangement 1006) and H is indicative of the amount of hysteresis applied by the hysteretic comparator 1002.

The output PWM signal SPWM thus encodes the level of the input signal SIN as the duty cycle of one of the pulses of output state, i.e. as a/(α+β).

Embodiments of the present disclosure utilise digital inverters to construct delays for time encoded signals. Using the combination of time encoding modulators and digital inverters for delay, filters can be designed without the need for large capacitors as is conventional for analogue circuit design.

Figure 12:
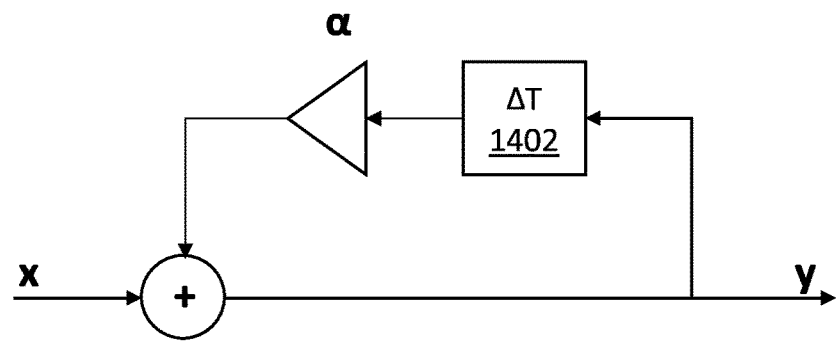
FIG. 12 is a schematic diagram of a known feedback comb filter.

FIG. 12 shows the structure of a feedback comb filter 1200 comprising a delay element 1202 having a delay ΔT, a gain element 1204 with gain α, and an adder 1206. As is known in the art, the feedback comb filter 1200 operates by adding a delayed version of the input signal x to itself causing constructive and destructive interference which provide the regularly spaced notches in its frequency response. The transfer function of the feedback comb filter 1200 is given by:

$$\frac{y}{x} = \frac{e^{\Delta T}}{e^{\Delta T} - \alpha}$$

Figure 13:
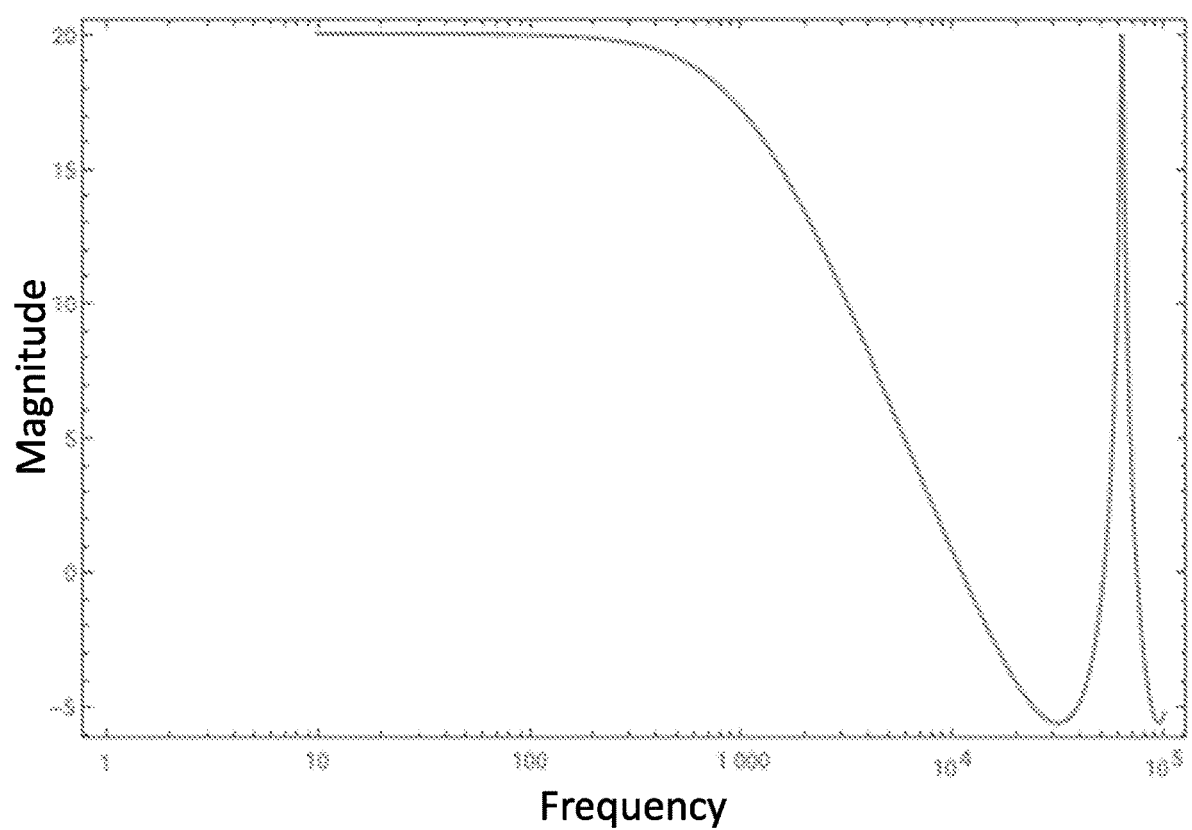
FIG. 13 is a graph showing the frequency response of the feedback comb filter of FIG. 12.

FIG. 13 is a graph of the frequency response of the feedback comb filter 1200 shown in FIG. 12 for a gain α of 0.9.

The inventors have realised that the feedback comb filter 1200 can be built using the combination of time encoding modulators and digital delay elements in the form of inventors.

Figure 14:
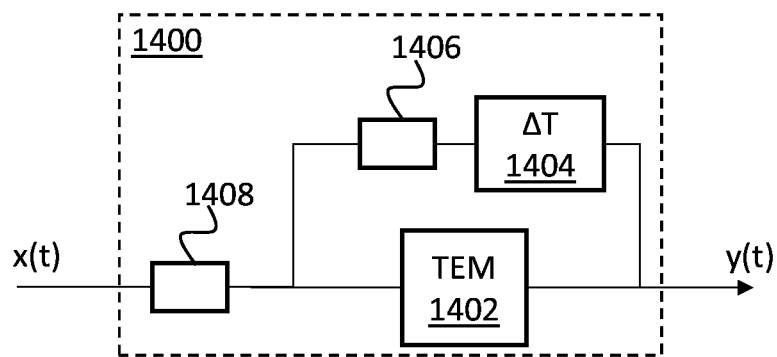
FIG. 14 is a schematic diagram of an exemplary implementation of the feedback comb filter of FIG. 12 according to embodiments of the present disclosure.

FIG. 14 is a schematic diagram of a feedback comb filter 1400 comprising a TEM 1402 and a delay element 1404 arranged in a feedback path between an input and an output of the TEM 1402. A first inductance 1406 is provided in series with the delay element 1404 in the feedback path. A second inductance 1408 is provided at the input of the first TEM 1208. The TEM 1402 may be a similar structure to the TEM 1000 shown in FIG. 10 or may be implemented using any other PWM topology, such as those described herein. Like the conventional feedback comp filter 1200, a delayed time encoded version of the input signal x(t) is added to the input signal x(t) to form the filtered output signal y. Thus, the feedback comb filter 1400 operates as an infinite impulse response (IIR) filter.

It will be appreciated that a key variability of the feedback comb filter 1400 is the variability of the delay ΔT. Thus, it is desirable for the delay ΔT to be controllable and stable.

Figure 15:
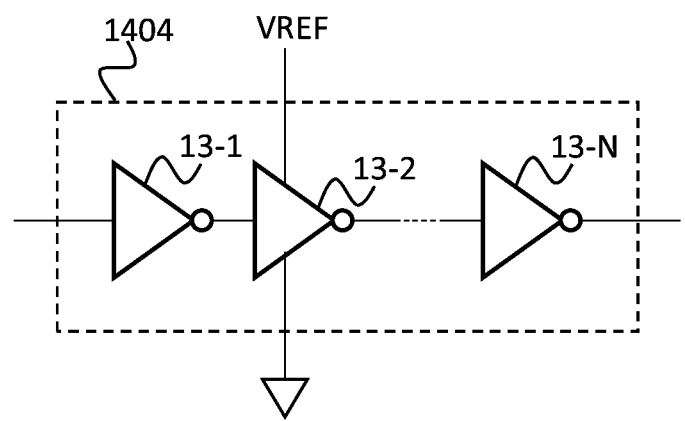
FIG. 15 is a schematic diagram of a delay element of the comb filter shown in FIG. 14.

FIG. 15 is a schematic diagram of the delay element 1404 according to various embodiments of the disclosure. The delay element 1404 comprises a plurality of inverters 15-1: 15-N connected in series, each configured to apply a delay. Preferably, the delay in at least one of the plurality of inverters 15-1:15-N is controlled by varying the supply voltage. In the example shown in FIG. 15, a controllable reference voltage VREF is provided as the supply voltage to the second inverter to control the delay in the delay element 1404.

Figure 16:
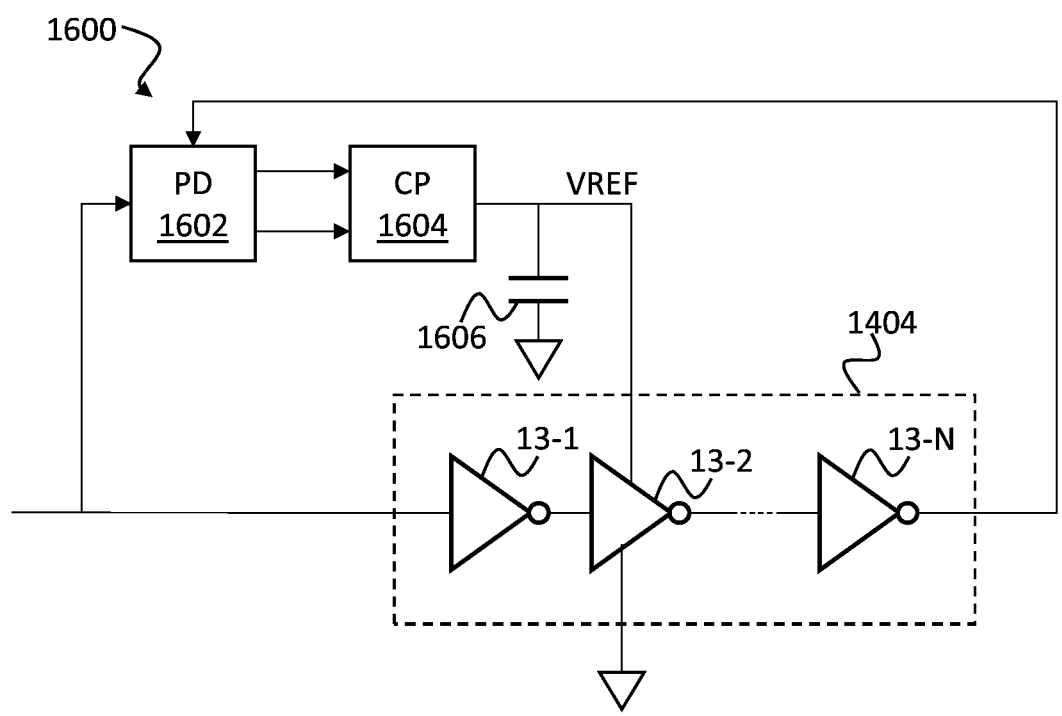
FIG. 16 is a schematic diagram of a control circuit for controlling the delay of the delay element shown in FIG. 15.

To stabilise the delay of the delay element 1404, a delayed lock loop (DLL) may be provided. FIG. 16 is a schematic diagram showing a DLL circuit 1600 for controlling the reference voltage VREF supplied to the delay element 1404. The DLL circuit comprises a phase detector (PD) 1602, a charge pump (CP) 1604 and a loop filter 1606. The phase detector 1602 compares an input signal provided to the delay element 1404 with the delay version of that signal output from the delay element 1404 and controls the charge pump 1604 to either increase or decrease the reference voltage VREF until the phase of the input signal matches that of the delayed version of that signal. Thus, the DLL circuit 1600 is configured to control the reference voltage VREF to maintain a fixed delay $\Delta T$ despite variations in process, voltage and temperature (PVT variations) which may affect the delay line.

Figure 17:
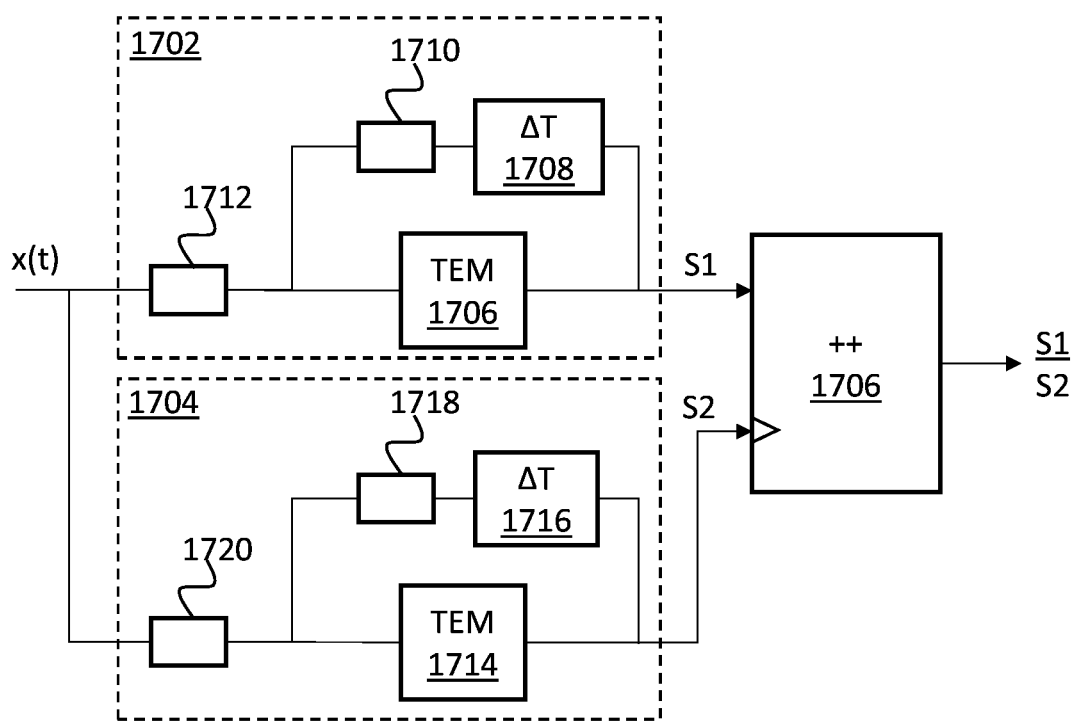
FIG. 17 is a schematic diagram of a ratio circuit according to embodiments of the present disclosure.

FIG. 17 is a schematic diagram of a circuit 1700 which may be implemented by the NSD module 204 for determining a ratio S1/S2 between the first and second band powers S1, S2. The circuit 1700 comprises a first feedback comb filter 1702, a second feedback comb filter 1704 and a counter 1706. The first and second feedback comb filters 1702, 1704 are constructed in a similar manner to the feedback comb filter 1400 described above with reference to FIGS. 14 to 16. The first feedback comb filter 1702 comprises a first TEM 1706 and a first delay element 1708 arranged in a feedback path between an input and an output of the first TEM 1706. A first inductance 1710 is provided in series with the first delay element 1708 in the feedback path. A second inductance 1712 is provided at the input of the first TEM 1706. The first feedback comb filter 1702 is configured to receive the microphone signal x(t) which is provided to the first TEM 1706 via the second inductance 1712 and output a first time encoded signal S1 representing the first frequency band S1.

The second feedback comb filter 1704 comprises a second TEM 1714 and a second delay element 1716 arranged in a feedback path between an input and an output of the second TEM 1714. A third inductance 1718 is provided in series with the delay element 1716 in the feedback path. A fourth inductance 1720 is provided at the input of the second TEM 1714. The first feedback comb filter 1704 is configured to receive the microphone signal x(t) which is provided to the first TEM 1714 via the second inductance 1720 and output a second time encoded signal S2 representing a second frequency band S2.

The first and second TEMs 1706, 1714 are configured to have different limit cycle periods and/or frequencies such that the first and second time encoded signal S1, S2 represent different first and second frequency bands.

The first time encoded signal S1 is provided as a data input to the counter 1706 and the second time encoded signal S2 is provided as a clock signal to the counter 1706. The counter 1706 may count the number of periods or oscillations of the second time encoded signal S2 in a single period or oscillation of the first time encoded signal S1. Thus, the output of the counter 1706 represents the fractions S1/S2.

Referring again to FIGS. 4 and 5, the NSD module 204 may be configured to detect the presence of natural speech (or the likelihood of natural speech) in the microphone signal x(t) by exploiting the natural articulation rate of natural speech. Due to the average rate of change of phoneme in natural human speech, the time domain envelope of human speech is modulated at a typical articulation rate of between 2 Hz and 10 Hz, for example between 4 Hz and 10 Hz. As shown in FIG. 6, when natural speech is replayed through a loudspeaker, the power of the replayed signal 604 is reduced at low and high frequencies (e.g. less than 200 Hz and greater than 1 kHz). This reduction in power compared to the power of natural speech means that modulation power is also reduced at low and high frequency bands. Such modulation is often below the background noise floor, such that modulation cannot be detected at these frequencies.

In some embodiments, therefore, the NSD module 204 may be configured to detect modulation at an articulation rate (e.g. 4 Hz to 10 Hz) in one or more low and/or high frequency bands of the received microphone signal x(t).

Figure 18:
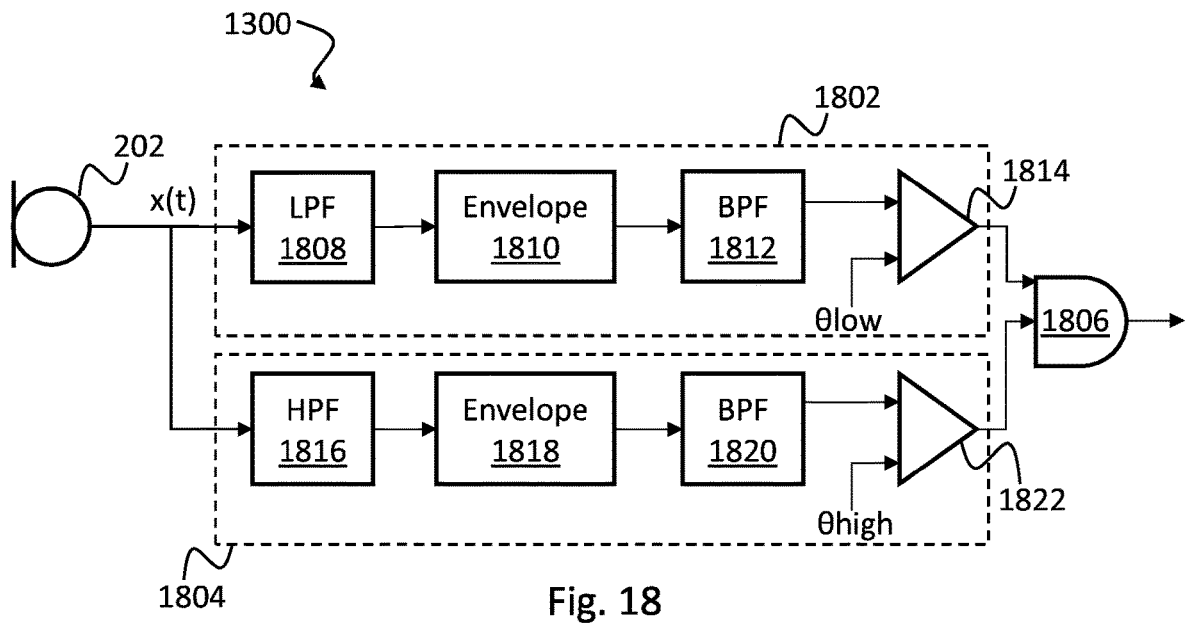
FIG. 18 is a schematic diagram of a natural speech detection circuit.

FIG. 18 is a schematic illustration of an example circuit 1800 which may be implemented by the NSD module 204 to detect natural speech in the microphone signal x(t). The circuit comprises a low frequency path 1802, a high frequency path 1804 and an AND gate 1806. The low frequency path 1802 comprises a low pass filter 1808, a first envelope filter 1810, a first bandpass filter 1812 and a first comparator 1814. The high frequency path 1804 comprises a high pass filter 1816, a second envelope filter 1818, a second bandpass filter 1820 and a second comparator 1822.

The microphone signal x(t) is provided to each of the low and high pass filters 1808, 1816. The low pass filter 1808 is configured to filter the microphone signal x(t) and output a low pass filtered signal to the first envelope filter 1810. The low pass filter 1808 may be configured to pass components of the microphone signal x(t) having a frequency of below, for example 200 Hz. The high pass filter 1816 is configured to filter the microphone signal x(t) and output a high pass filtered signal to the second envelope filter 1818. The high pass filter 1816 may be configured to pass components of the microphone signal x(t) having a frequency greater than, for example 10 kHz or 20 kHz.

The first envelope filter 1810 is configured to extract an envelope of the low pass filtered signal and output the envelope to the first bandpass filter 1812. Likewise, the second envelope filter 1818 is configured to extract an envelope of the high pass filtered signal and output the envelope to the second bandpass filter 1820.

As mentioned above, the envelope of natural speech typically has an articulation rate of between 4 Hz and 10 Hz. Accordingly, each of the first and second bandpass filters 1812, 1820 may be configured to pass components of the respective envelopes output by the first and second envelope filters 1810, 1818 having a frequency of between 4 Hz and 10 Hz. The bandpass filtered envelopes are then provided to respective first and second comparators 1814, 1822.

The first comparator 1814 is configured to compare the bandpass filtered envelope to a low frequency threshold. When the first bandpass filtered envelope exceeds to low frequency threshold voltage, the output of the first comparator 1814, which is provided to the AND gate, goes high. When the first bandpass filtered envelope is below the low frequency threshold, the output of the first comparator 1814 goes low.

The second comparator 1822 is configured to compare the bandpass filtered envelope to a high frequency threshold amplitude. When the second bandpass filtered envelope exceeds to high frequency threshold voltage, the output of the second comparator 1822, which is provided to the AND gate, goes high. When the second bandpass filtered envelope is below the high frequency threshold, the output of the second comparator 1814 goes low.

The AND gate outputs a high signal representing the presence of natural speech when the first and second bandpass filtered signals output from respective first and second bandpass filters 1812, 1820 are greater than respective low and high frequency threshold voltages.

In some embodiments one or more of the low-pass filter 1808, the high pass filter 1816 and the first and second bandpass filter 1812, 1820 may be implemented as feedback comb filters, such as the feedback comb filter 1400 described with reference to FIG. 14.

Figure 19:
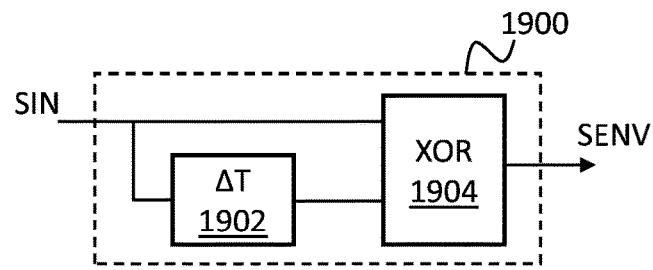
FIG. 19 is a schematic diagram of an envelope filter.

In some embodiments, one or both of the first and second envelope filters 1810 may be implemented using an XOR module. FIG. 19 shows an example implementation of an envelope filter 1900. In this example, the envelope filter 1900 comprises a delay element 1902 and an XOR module 1904. The XOR module receives an input signal SIN which is provided as a first input to the XOR module 1904 and an input to the delay element 1902. The delay element 1902 provides a delayed version of the input signal SIN to the XOR module 1904 as its second input. When the input signal SIN and the delayed version of the input signal SIN are in phase, the XOR module 1904 output is zero. When the two signals (input signal SIN and delayed version) differ in phase, the XOR gate's output will be high for a fraction of each cycle of the input signal, the fraction dependent on the phase difference between the two signals. Since the input signal SIN is a digital signal, any edge in the input signal SIN will generate a difference between the two inputs to the XOR module 1904. Thus, the XOR module 1904 functions as an edge detect, and for a time-encoded signal the rate of edge detect events or toggles is proportional to the input signal squared or SIN^2.

In some embodiments, the NSD module 204 may determine whether the received microphone signal x(t) comprises natural speech based on making a determination both as to whether the received microphone signal x(t) comprises natural speech and whether the received microphone signal x(t) comprises replayed speech. For example, the NSD module 204 may be configured to determine a likelihood that the received microphone signal x(t) comprises natural speech and a likelihood that the received microphone signal x(t) comprises replayed speech, and make a decision regarding whether the received microphone signal x(t) comprises natural speech (or replayed speech) based on the determined likelihoods. The NSD module 204 may use any of the signal generated by any of the methods described above in the determination of such likelihoods.

Figure 20:
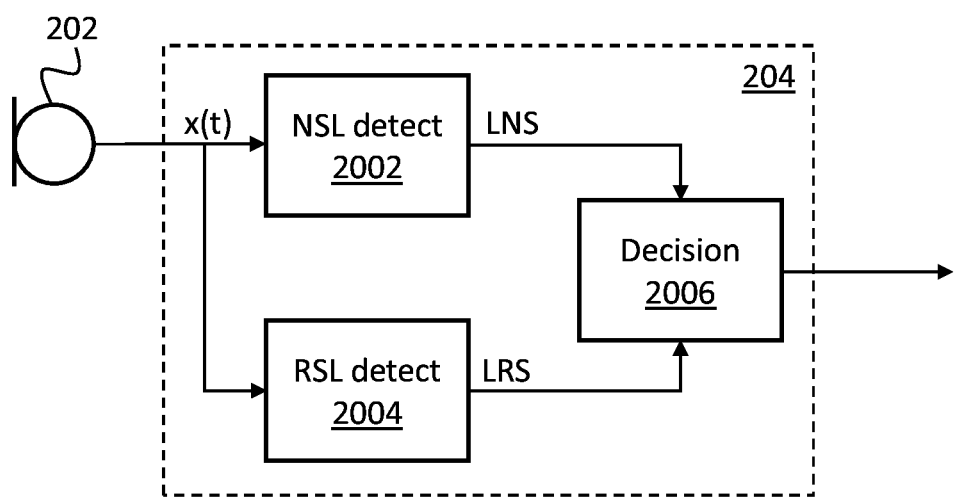
FIG. 20 is an example implementation of a natural speech detection module.

FIG. 20 is an example implementation of the NSD module 204 according to embodiments of the present disclosure. The example implementation may be implemented in combination with any of the circuits and/or modules described above with reference to the NSD module 204. The NSD module 204 comprises a natural speech likelihood (NSL) module 2002, a replayed speech likelihood (RSL) module 2004 and a decision module 606. The NSL module 2002 and the RSL module 2004 each receives the microphone signal x(t) from the transducer 202. The NSL module 2002 processes the microphone signal x(t) and outputs to the decision module 2006 a likelihood or probability LNS that the speech is natural, i.e. is the product of live human speech received at the microphone 110. The NSL module 2002 may determine the likelihood based on any of the techniques described above with reference to FIGS. 6 to 19. The RSL module 2004 processes the microphone signal x(t) and outputs to the decision module 2006 a likelihood or probability RNS that the speech is replayed, i.e. is the product of speech sound generated by a loudspeaker. The RSL module 2002 may determine the likelihood based on any of the techniques described above with reference to FIGS. 6 to 19.

The decision module 606 then outputs a trigger signal T. The trigger signal T may comprise a binary indication (i.e. that the speech present in the microphone signal x(t) is natural, or not natural). In some embodiments, the decision module 2006 may make a determination that the microphone signal contains natural speech by comparing the likelihoods LNS, LRS. For example, if the likelihood LNS that the speech is natural speech is greater than the likelihood LRS that the speech is replayed, then the trigger signal T may indicate that the microphone signal comprises natural speech. Conversely, if the likelihood LRS that the speech is replayed is greater than the likelihood LNS that the speech is natural speech, then the trigger signal T may indicate that the microphone signal comprises replayed speech (or does not comprise natural speech). In another example, if the likelihood LNS that the speech is natural speech exceeds the likelihood LRS that the speech is replayed by a predetermined threshold, then the trigger signal T may indicate that the microphone signal comprises natural speech. Conversely, if the likelihood LRS that the speech is replayed exceeds the likelihood LNS that the speech is natural speech by a predetermined threshold, then the trigger signal T may indicate that the microphone signal comprises natural speech. In yet another example, the decision module 2006 may determine a ratio of the likelihood LNS that the speech is natural speech to the likelihood LRS that the speech is replayed (or vice versa). If the ratio exceeds a threshold, then trigger signal T may indicate that the microphone signal comprises natural speech.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional program code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

Note that as used herein the term module shall be used to refer to a functional unit or block which may be implemented at least partly by dedicated hardware components such as custom defined circuitry and/or at least partly be implemented by one or more software processors or appropriate code running on a suitable general purpose processor or the like. A module may itself comprise other modules or functional units. A module may be provided by multiple components or sub-modules which need not be co-located and could be provided on different integrated circuits and/or running on different processors.

Embodiments may be implemented in a host device, especially a portable and/or battery powered host device such as a mobile computing device for example a laptop or tablet computer, a games console, a remote control device, a home automation controller or a domestic appliance including a domestic temperature or lighting control system, a toy, a machine such as a robot, an audio player, a video player, or a mobile telephone for example a smartphone.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A microphone device, comprising:
   a microphone configured to generate an audio signal representing sound incident on the microphone;
   a natural speech detection circuitry configured to:
      determine a first likelihood that the sound was generated by a loudspeaker; and
      detect natural speech in the audio signal based on the determined first likelihood;
   wherein, on detection of the natural speech in the audio signal, the natural speech detection circuitry is configured to output a trigger signal to speech processing circuitry to process the natural speech in the audio signal;
   wherein determining the first likelihood that the sound has been generated by a loudspeaker comprises:
      determining a first power in a first frequency band of the audio signal;
      determining a second power in a second frequency band of the audio signal; and
      comparing the first power to the second power.

2. The device of claim 1, wherein the natural speech detection circuitry consumes less power than the speech processing circuitry.

3. The device of claim 1, wherein the natural speech detection circuitry is directly connected to the microphone.

4. The device of claim 1, wherein the microphone is packaged with the natural speech detection circuitry.

5. The device of claim 1, further comprising:
   a signal activity detector for detecting signal activity in the audio signal, wherein, on detection of the signal activity, the signal activity detector is configured to output a signal activity to signal the natural speech detection circuitry,
   wherein the natural speech detection circuitry is configured to detect the natural speech in the audio signal in response to the signal activity signal.

6. The device of claim 1, wherein the natural speech detection circuitry is configured to:
   determine a second likelihood that the audio signal represents natural speech; and
   determine whether the audio signal represents natural speech based on the first likelihood and the second likelihood.

7. The device of claim 6, wherein determining that the audio signal represents natural speech based on the first likelihood and the second likelihood comprises:
   determining a ratio between the first likelihood and the second likelihood.

8. The device of claim 6, wherein determining the second likelihood comprises:
   detecting modulation of a third frequency band of the audio signal at a speech articulation rate or at a rate of between 4 Hz and 10 Hz.

9. The device of claim 8, wherein detecting modulation of the third frequency band of the audio signal at a speech articulation rate or at a rate of between 4 Hz and 10 Hz comprises:
   low-pass filtering the audio signal;
   generating an envelope of the low-pass filtered audio signal;
   band-pass filtering the enveloped low-pass filtered audio signal; and
   determining a frequency of the band-pass filtered enveloped low-pass filtered audio signal.

10. The device of claim 9, wherein the natural speech detector comprises a time encoding machine configured to perform one or more of the low pass filtering and the band-pass filtering.

11. The device of claim 8, wherein detecting modulation of the third frequency band of the audio signal at a speech articulation rate or at a rate of between 4 Hz and 10 Hz comprises:
   high-pass filtering the audio signal;
   generating an envelope of the high-pass filtered audio signal;
   band-pass filter the enveloped high-pass filtered audio signal; and
   determining a frequency of the band-pass filtered enveloped low-pass filtered audio signal.

12. The device of claim 6, wherein determining the second likelihood comprises:
   detecting modulation of a third frequency band of the audio signal at a speech articulation rate or at a rate of between 4 Hz and 10 Hz.

13. The device of claim 6, wherein determining that the audio signal represents natural speech based on the first likelihood and the second likelihood comprises determining that the second likelihood is greater than the first likelihood.

14. The device of claim 6, wherein determining the first likelihood that the sound has been generated by a loudspeaker comprises:
   determining that the first power exceeds a first threshold; and
   determining that the second power exceeds a second threshold.

15. The device of claim 6, wherein determining the ratio comprises:
   time-encoding the audio signal to generate a first pulse-width modulated (PWM) signal representing the first frequency band;
   time-encoding the second signal to generate a second PWM signal representing the second frequency band.

16. The device of claim 15, wherein determining the ratio further comprises:
   providing the first PWM signal to a counter synchronised to a clock signal;
   providing the second PWM signal to the counter as the clock signal; and
   outputting the ratio from the counter.

17. A system, comprising:
   the device of claim 1; and
   speech processing circuitry, wherein the device operates in the analogue domain and wherein the speech processing circuitry operates in the digital domain.

18. An apparatus for detecting whether a sound has been generated by natural speech, the apparatus comprising:
   an input for receiving an audio signal comprising the sound; and
   one or more processors configured to:
     determine a first likelihood that the sound is natural speech;
     determine a second likelihood that the sound has been generated by a loudspeaker; and
     detect whether the sound has been generated by natural speech based on the first likelihood and the second likelihood;
   wherein determining the second likelihood that the sound has been generated by a loudspeaker comprises:
     determining a first power in a first frequency band of the audio signal;
     determining a second power in a second frequency band of the audio signal; and
     comparing the first power to the second power.

19. A non-transitory storage medium having instructions thereon which, when executed by a processor, cause the processor to:
   receive an audio signal comprising sound;
   determine a first likelihood that the sound is natural speech;
   determine a second likelihood that the sound has been generated by a loudspeaker; and
   detect whether the sound has been generated by natural speech based on the first likelihood and the second likelihood;
   wherein determining the second likelihood that the sound has been generated by a loudspeaker comprises:
     determining a first power in a first frequency band of the audio signal;
     determining a second power in a second frequency band of the audio signal; and
     comparing the first power to the second power.

* * * * *